Dec. 15, 1931. G. W. KIDD 1,836,851
PRIMARY ARITHMETIC SET
Filed May 29, 1930 2 Sheets-Sheet 1
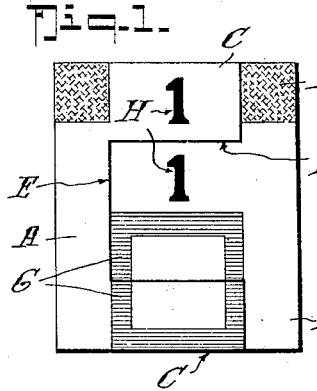
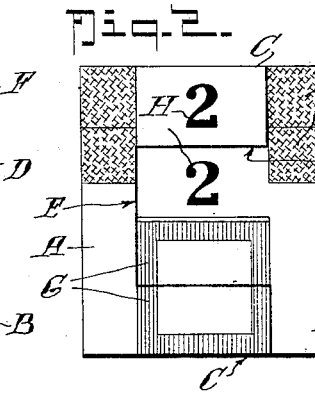
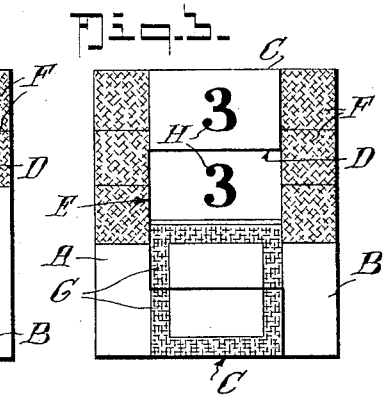
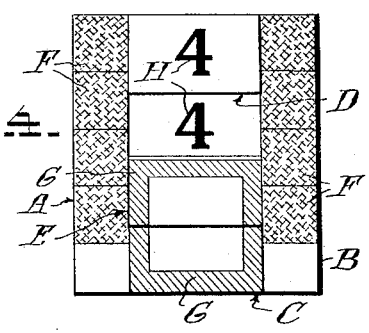
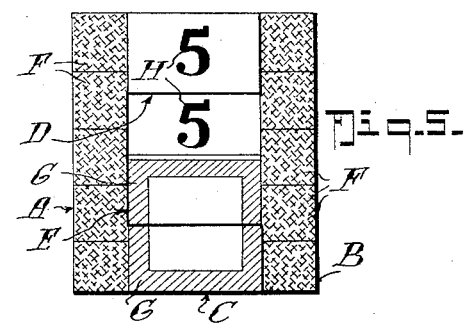
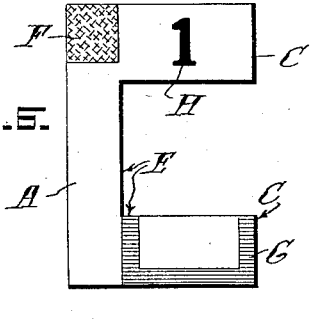
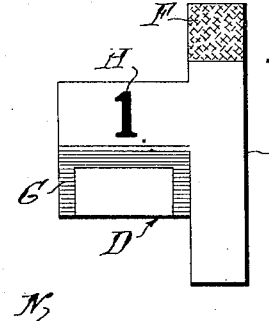
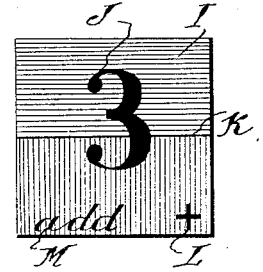
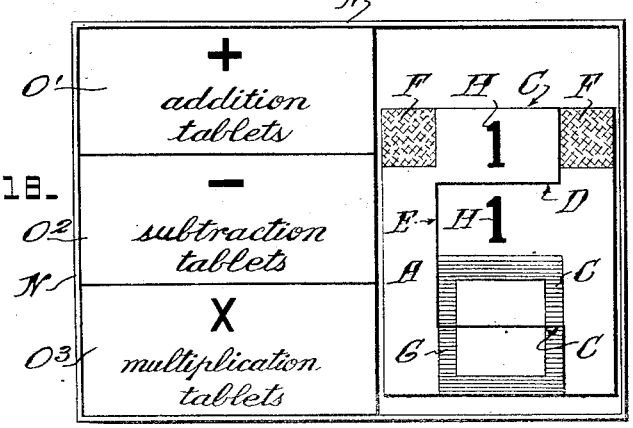
INVENTOR
G. W. Kidd.
BY
ATTORNEY Dec. 15, 1931. G. W. KIDD 1,836,851
PRIMARY ARITHMETIC SET
Filed May 29, 1930  2 Sheets-Sheet 2
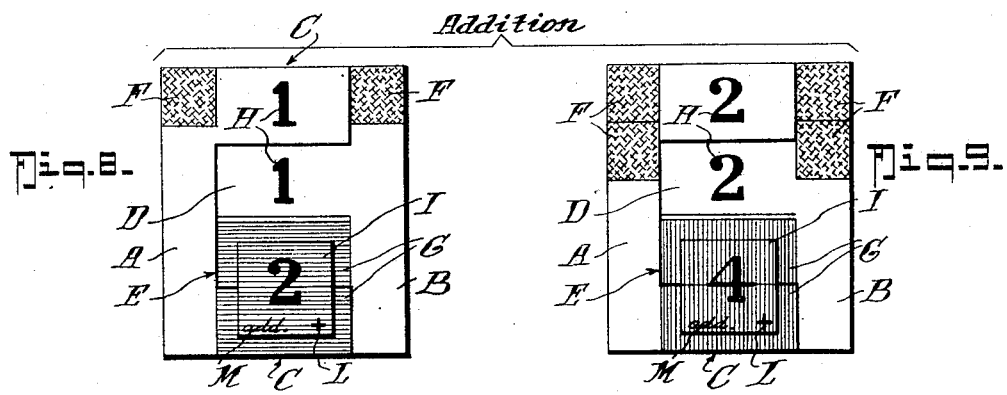
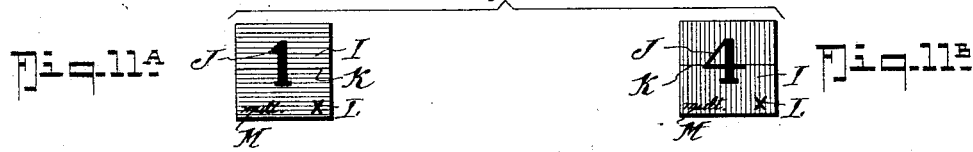
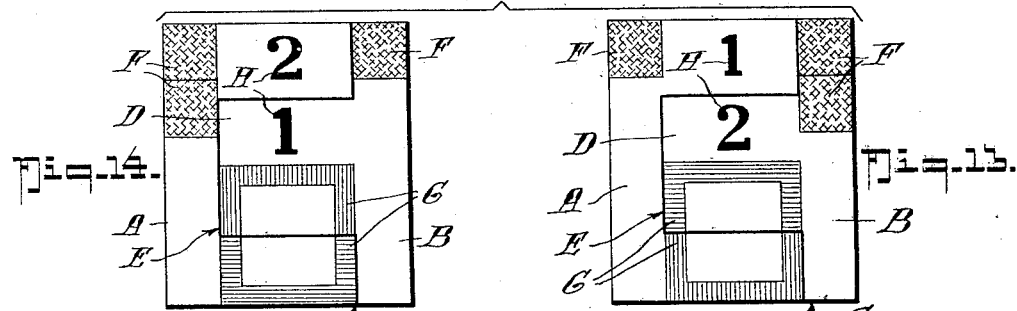
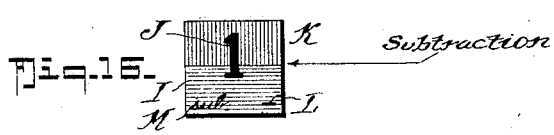
INVENTOR
G. W. Kidd.
BY
ATTORNEY Patented Dec. 15, 1931

1,836,851

UNITED STATES PATENT OFFICE

GEORGE W. KIDD, OF VICTORIA, BRITISH COLUMBIA, CANADA

PRIMARY ARITHMETIC SET

Application filed May 29, 1930. Serial No. 457,312.

My invention has for an object to provide a set of cards and corresponding sets of small tablets, one set to be used for additions, and another set to be used for substractions, and a third set to be used for multiplications, so that by matching colors on the cards and tablets numbers from one to five may be added, substracted or multiplied as desired.

Further, it is an object of the invention to provide a means for teaching addition, substraction and multiplication to very young pupils by the simple act of combining sections of the cards of a set and matching their colors with those of a small tablet, the card sections containing the two numbers to be added, substracted or multiplied and the tablet of corresponding colors containing the resultant or answer.

Further, it is an object to provide a self-verifying number device giving all possible combinations in addition, substraction and multiplication of selected groups of numbers, as one to five inclusive, the resultant being obtained by matching of colors, verification in addition being obtainable by providing each card section with colored areas equal in number to that of the index number which the card section bears, the sum of such areas equalling the resultant or answer.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:

Figures 1 to 5 are face views of a set of cards embodying my invention.

Figures 6 and 7 are face views of the first card of the set separated.

Figures 8 and 9 are face views of the first and second cards with the corresponding "addition" tablets laid thereon:

Figures 10$^A$ and 10$^B$ are face views of the "substraction" tablets associative with the combined cards of Figures 8 and 9 respectively.

Figures 11$^A$ and 11$^B$ are face views of the "multiplication" tablets associative with the combined cards of Figures 8 and 9 respectively.

Figure 12 is an enlarged view of one of the tablets.

Figures 13 and 14 are face views of the first and second set of cards combined with each other.

Figures 15$^A$ and 15$^B$ are face views of the "addition" tablets corresponding to the combined cards of Figures 13 and 14 respectively.

Figure 16 is a face view of the "substraction" tablets corresponding to the combined cards of Figure 14.

Figures 17$^A$ and 17$^B$ are face views of the "multiplication" tablets corresponding to the combined cards of Figures 13 and 14 respectively.

Figure 18 is a plan view of the container for the set of cards and tablets showing the separate boxes for the tablets, the container cover being omitted.

In the drawings, in which like letters and numerals of reference indicate like parts in all of the figures, it will be seen that there is provided a set of cards, each composed of two sections, one of which A has a recess to provide a pair of spaced projections C while the other section B has a tongue D to fit the space of the section A as male and female. The two sections A and B it will thus be seen are separable on a line E.

The upper projection or tongue C of the section A carries a value number H, a similar value number H being carried by the upper half of the tongue D. The lower half of the tongue or projection D is provided with one-half of a colored square band G, the other half G of which is provided on the lower projection or tongue C of the section A, the arrangement being such that when the two sections of the card are assembled, see Figures 1 to 5 and 8 and 9, the outline half squares G—G combine to produce a hollow square, i. e. a central clear area within the outer square band area G.

Each card of a set has its area G colored the same on both of its sections, for example the area G of card numbered 1 is colored say blue, that of card numbered 2 is colored red, that of card numbered 3 colored yellow, and that of card numbered 4 is colored green, while that of card numbered 5 is colored brown.

Each card also has a number of squares F on each section corresponding to the value of the card, these squares F being colored a distinctive color from the rest, say for example orange. Card numbered 1 will have one orange area F on each of its sections. Card numbered 2 will have two orange areas F on each of its sections. Card numbered 3 will have three each. Card numbered 4 will have four each, and card numbered 5 will have five orange areas F on each of its sections, the purpose of which will presently appear.

Three sets of tablets I are provided, one set representing addition resultants, another set representing substraction resultants, and a third set representing multiplication resultants. Each tablet I carries a number giving the value of the resultant as for example the number 3 (see Figure 12), this number being indicated at J in the drawings. Each tablet I is also provided with a dividing line K separating it into an upper and a lower area, the lower area being preferably provided with a mark or symbol L representing addition, subtraction or multiplication as the case may be, and with an abbreviation M representing addition, substraction or multiplication as the case may be.

The tablets of the several sets have their upper and lower half areas colored to correspond with the coloring of the particular card sections A, B with which they respectively cooperate. For example, where the card numbered 1 is taken in its entirety the addition tablet I representing the sum of the numbers 1 and 1 on the card will have both its upper and lower areas colored blue to correspond with the blue coloring of the hollow square G of the numbered 1 card, so also will the substraction and multiplication tablets I associated with the numbered 1 tablet complete be colored throughout blue. Likewise, the tablets representing addition, subtraction and multiplication of the numbered 2 card will be colored throughout red, the numbered 3 card tablets will be colored yellow, the numbered 4 green and the numbered 5 brown.

Those tablets, however, of the addition, substraction and multiplication sets which carry the resultant of the addition, substraction or multiplication of combined cards have their upper and lower areas differently colored. For example, by reference to Figures 13 to 17 where cards 1 and 2 are shown combined there will be two addition cards I, one of which will have its upper half area colored red and its lower half area colored blue for association with the combined card of Figure 13, and the second of the tablets of the addition set will have the upper half area blue and the lower half area red to correspond with the combined card of Figure 14. The multiplication tablets I corresponding to the combined cards will be correspondingly colored in their upper and lower half areas.

Since the greater number cannot be substracted from the lesser in the combined card of Figure 13 there will be no tablet in the substraction set for association with the combined card shown in Figure 13, but as the lesser number can be taken from the greater in the combined card of Figure 14 there will be a substraction tablet I in the substraction set, see Figure 16, the upper half of which will be colored blue and the lower half colored red.

The tablets for the other cards of the set and their grouping will be correspondingly colored so that by simply matching two parts of any of the set of cards together, and finding the tablet in either the addition, substraction or multiplication set which is colored to correspond with the coloring of the hollow square G—G, that tablet will give the resultant or answer to the problem by the addition, substraction or multiplication as the case may be.

In cases of addition the result may be checked by simply adding the number of orange areas F on the card under consideration. For example in Figure 14 the addition of the values 2 and 1 is given as 3 on the corresponding tablet I, Figure 15$^B$, and this is verified by adding the three orange areas F, two of which are on the left of the numbered 2 card section and the other on the right on numbered 1 card section.

From the foregoing description, it will be seen that by interchanging the sections of cards A, B many such combinations of the numbers may be obtained. For example if the male section 3 be combined with the female section 4 we obtain the combinations 4 plus 3, 4 minus 3 and 3 times 4. If the female section of card numbered 3 be combined with the male section of card numbered 4 we obtain the combinations of 3 plus 4, and 4 times 3.

For convenience the parts constituting the set are put up in a suitable box N within which are contained three smaller boxes O', O$^2$, and O$^3$, the first of these smaller boxes having printed thereon suitable indicating data as shown in Figure 18 indicating addition, substraction and multiplication respectively, the remainder of the box N serving as a compartment for the reception of the cards of the set.

From the foregoing description, taken in connection with the accompanying drawings, it is thought the construction, and advantages of my invention will be clear to those skilled in the art to which it relates.

What I claim is:

1. In educational appliances, a set of cards each card of which is composed of a male and a female section, the sections of each card having thereon a number representing the value thereof, each card of the set having thereon when in matched relation a suitable marking outline representing a hollow square having a central clear area, the marking outline of the hollow squares of the several cards of the set being differently colored, cooperating with a set of tablets each tablet being adapted to fit the central clear area of said hollow squares and containing a number which is the resultant of the addition of the numbers on the associated male and female sections of the card, said tablets each having an upper and a lower area colored to match the colors of the outline of the respective hollow square halves of the card with which the tablets are associated.

2. In educational appliances, a set of cards each card of which is composed of a male and a female section, the sections of each card having thereon a number representing the value thereof, each card of the set having thereon when in matched relation a suitable marking outline representing a hollow square having a central clear area, the marking outline of the hollow squares of the several cards of the set being differently colored, cooperating with a set of tablets each tablet being adapted to fit the central clear area of said hollow squares and containing a number which is the resultant of the substraction of the numbers on the associated male and female sections of the card, said tablets each having an upper and a lower area colored to match the colors of the outline of the respective hollow square halves of the card with which the tablets are associated.

3. In educational appliances, a set of cards each card of which is composed of a male and a female section, the sections of each card having thereon a number representing the value thereof, each card of the set having thereon when in matched relation a suitable marking outline representing a hollow square having a central clear area, the marking outline of the hollow squares of the several cards of the set being differently colored, cooperating with a set of tablets each tablet being adapted to fit the central clear area of said hollow squares and containing a number which is the resultant of the multiplication of the numbers on the associated male and female sections of the card, said tablets each having an upper and a lower area colored to match the colors of the outline of the respective hollow square halves of the card with which the tablets are associated.

4. In educational appliances, a set of cards each card of which is composed of a male and a female section, the sections of each card having thereon a number representing the value thereof, each card of the set having thereon when in matched relation a suitable marking outline representing a hollow square having a central clear area, the marking outline of the hollow squares of the several cards of the set being differently colored, cooperating with a set of tablets each tablet being adapted to fit the central clear area of said hollow squares and containing a number which is the resultant of the addition of the numbers on the associated male and female sections of the card, said tablets each having an upper and a lower area colored to match the colors of the outline of the respective hollow square halves of the card with which the tablets are associated, each card section having a distinctively colored area or areas corresponding in number to the value of the sections.

5. In educational appliances, a set of cards each card of which is composed of a male and a female section, the sections of each card having thereon a number representing the value thereof, each card of the set having thereon when in matched relation a suitable marking outline representing a hollow square having a central clear area, the marking outline of the hollow squares of the several cards of the set being differently colored, cooperating with a set of tablets each tablet being adapted to fit the central clear area of said hollow squares and containing a number which is the resultant of the substraction of the numbers on the associated male and female sections of the card, said tablets each having an upper and a lower area colored to match the colors of the outline of the respective hollow square halves of the card with which the tablets are associated, each card section having a distinctively colored area or areas corresponding in number to the value of the sections.

6. In educational appliances, a set of cards each card of which is composed of a male and a female section, the sections of each card having thereon a number representing the value thereof, each card of the set having thereon when in matched relation a suitable marking outline representing a hollow square having a central clear area, the marking outline of the hollow squares of the several cards of the set being differently colored, cooperating with a set of tablets each tablet being adapted to fit the central clear area of said hollow squares and containing a number which is the resultant of the multiplication of the numbers on the associated male and female sections of the card, said tablets each having an upper and a lower area colored to match the colors of the outline of the respective hollow square halves of the card with which the tablets are associated, each card section having a distinctively colored area or areas corresponding in number to the value of the sections.

7. In educational appliances, a set of cards each card of which is composed of a male and a female section, a value designating number on each section and value designating distinctive areas on each section corresponding in number to the number value designation of that section, each section having thereon a suitable marking outline representing one-half of a hollow square having a central square area, the halves of the hollow squares matching with one another when the sections are assembled, and a plurality of sets of resultant-value tablets associated with said cards, one set of tablets representing additions, one set representing substractions, and the other set representing multiplications of the value designating numbers of associated card sections, each hollow square of the cards having its outline distinctively colored and each tablet having correspondingly colored areas, substantially as and for the purposes described.

8. In educational appliances, a set of cards each card of which is composed of a male and a female section, a value designating number on each section and value designating distinctive areas on each section corresponding in number to the number value designation of that section, each section having thereon a suitable marking outline representing one-half of a hollow square having a central square area, the halves of the hollow squares matching with one another when the sections are assembled, and a plurality of sets of resultant-value tablets associated with said cards, one set of tablets representing additions, one set representing substractions, and the other set representing multiplications of the value designating numbers of associated card sections, each hollow square of the cards having its outline distinctively colored and each tablet having correspondingly colored areas, each tablet having thereon a symbol indicating whether it be an addition, a substraction or a multiplication tablet.

9. In educational appliances of the character described, a master card consisting of two sections having male and female engagement with one another, each of said sections bearing a value designating number and each of said sections having value designating areas corresponding in number to the value of the number carried by the respective sections, each of said sections also having a suitable marking outline representing one-half of a hollow square, the halves of the sections being positioned to match when the sections are assembled.

10. In educational appliances of the character described, a master card consisting of two sections having male and female engagement with one another, each of said sections bearing a value designating number and each of said sections having value designating areas corresponding in number to the value of the number carried by the respective sections, each of said sections also having a suitable marking outline representing one-half of a hollow square, the halves of the sections being positioned to match when the sections are assembled, the marking outlines of the halves of the hollow square being distinctively colored for the association therewith of resultant-value tablets having correspondingly colored areas whereby association of the proper tablet with the particular card under consideration is obtained by matching the colors.

GEORGE W. KIDD.